United States Patent

[11] 3,628,158

[72] Inventor Erik Ivar Sjoquist
Farsta, Sweden

[21] Appl. No. 869,756
[22] Filed Oct. 27, 1969
[45] Patented Dec. 14, 1971
[73] Assignee Telefonaktiebolaget LM Ericsson
Stockholm, Sweden
[32] Priority Nov. 15, 1968
[33] Sweden
[31] 15508/68

[54] ARRANGEMENT AT PARALLELLY WORKING MACHINES
7 Claims, 2 Drawing Figs.

Figure 1:
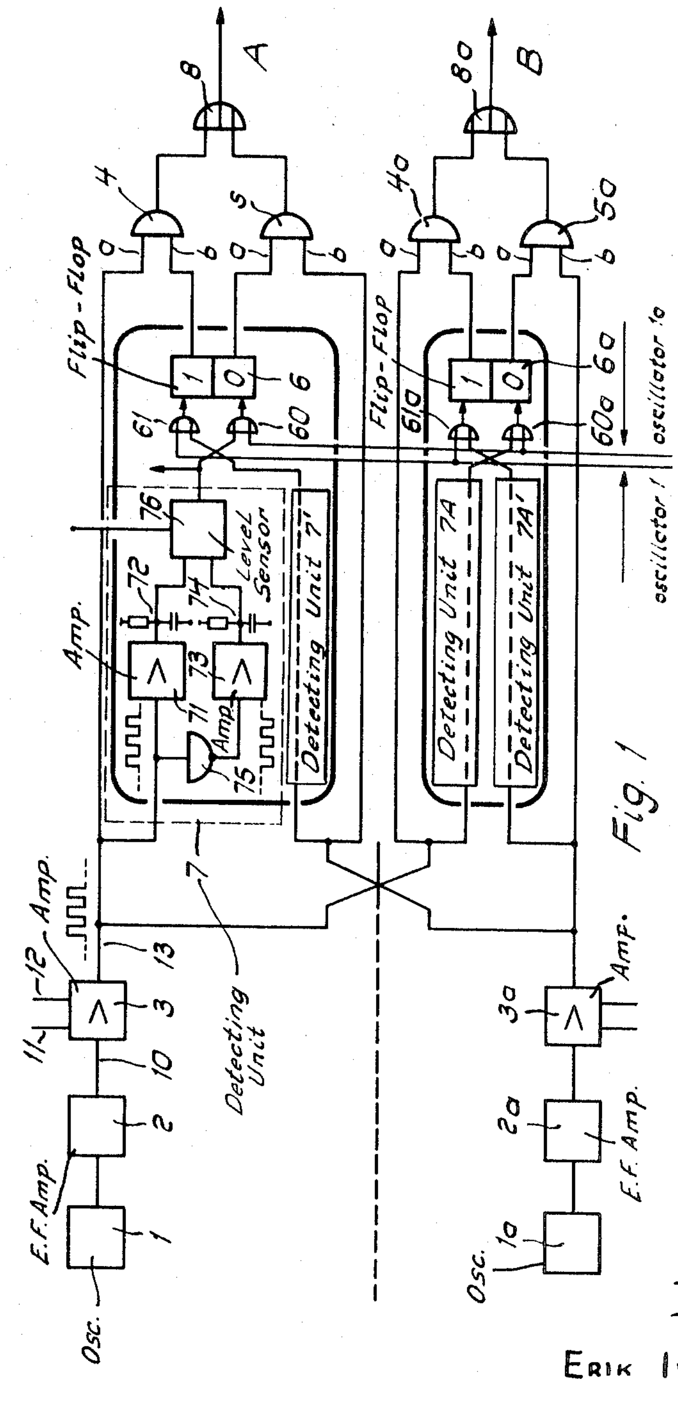

[52] U.S. Cl. .......... 328/71, 307/208, 307/219, 307/234, 307/290, 307/295, 331/49, 328/120
[51] Int. Cl. .......... H03k 17/02
[50] Field of Search .......... 331/49; 307/219, 269, 290, 295, 234, 208; 328/71, 120

[56] References Cited

UNITED STATES PATENTS

| | | | |
|---|---|---|---|
| 3,289,097 | 11/1966 | Martin | 307/219 |
| 3,329,905 | 7/1967 | Niertit et al. | 331/49 |
| 3,431,510 | 3/1969 | Reis et al. | 331/49 |
| 3,479,603 | 11/1969 | Overstreet | 328/61 |

OTHER REFERENCES

IBM Technical Disclosure Bulletin, Vol. 12, No. 1, June 1969, " Redundancy Technique for Crystal Oscillators" by Duke, (2 pages 147, 148)

*Primary Examiner*—Donald D. Forrer
*Assistant Examiner*—Harold A. Dixon
*Attorney*—Hane & Baxley ABSTRACT: There is disclosed a fail-safe apparatus for supplying clock pulses to parallelly working machines, preferably computers. An oscillator is associated with each machine and is connectable to the respective machine as well as to the adjacent machines via logical circuits. These circuits are controlled by bistable flip-flops which are triggered from frequency sensing devices in such a way that when the frequency of an oscillator for some reason changes the associated flip-flop changes its state and connects the oscillator associated with an adjacent machine to the machine controlled by the defective oscillator.

INVENTOR

ERIK IVAR SJÖQUIST

BY Hane and Baxley

ATTORNEYS

ARRANGEMENT AT PARALLELLY WORKING MACHINES

The present invention relates to an arrangement for parallelly working machines preferably computers, the arrangement being intended to connect one of a number of oscillators each associated with one respective machine for emitting synchronous clock frequency pulses to the parallelly working machines.

In parallelly working computers it is necessary that the oscillator pulses of the respective computers work in synchronism, since each operation is a computer must coincide exactly with the corresponding operation in the paraliely working computer.

As a rule each computer unit is provided with an oscillator for generating a clock frequency sing. It has been proposed that when two computers are working parallelly, the tow oscillators should control each other. However, the synchronism will easily be lost when faults occur in the oscillator circuits; furthermore construction difficulties are met when trying to achieve synchronizing circuits such that single faults do not cause a losing of the clock frequency in both the computers.

The present invention relates to a special arrangement which causes a connection of the one oscillator to two parallelly working computers, so that both the computers utilize one and the same oscillator, and in such a manner that wherever in the oscillator controller switching circuits a single fault occurs the computer units receive synchronous clock frequencies, At a fault in this oscillator the other oscillator is automatically switched in so as to emit synchronizing pulses to the two parallelly working computers.

The characteristics of the arrangement according to the present invention is indicated in the characterizing part of the following claims.

The invention is of course not limited to use with parallelly working computers but can be used whenever different machines require clock frequencies.

Figure 2:
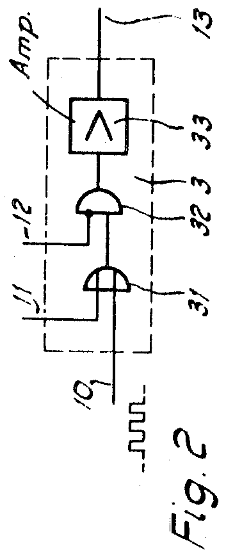

In the accompanying drawing an arrangement according to the principles of the invention is shown, wherein FIG. 1 indicates a simplified circuit diagram of the arrangement and;

FIG. 2 indicates a simplified diagram of a special amplifier included in the arrangement;

FIG. 2 indicates a simplified diagram of a special amplifier included in the arrangement.

In FIG. 1 in the accompanying drawing there is shown the arrangement according to the invention when applied to two parallelly working computers.

The arrangement is consequently intended to be able to connect one of the two oscillators associated with the respective computer so that this oscillator will be able to emit synchronous clock frequency pulses to the two parallely working computers A and B.

According to FIG. 1 the arrangement comprises two parallel circuits. Each circuit is the same with the elements of the circuit B being identified by reference numbers with the postscript *a*. Circuit A comprises crystal oscillator 1 having a determined oscillator frequency, for example 2.5 MHz. This crystal oscillator is connected to a circuit amplifier gives square wave signals, for example, an emitter follower amplifier 2. These square wave signals pass through an amplifier 3, the details of which will be explained in connection with FIG. 2. Each oscillator 1 is directly connected to one input *2* of a first AND-circuit 4 which together with a second AND-circuit 5 belongs to each computer. The other input *b* of the first AND-gate 4 and the first input *a* of the second AND-gate 5 are connected to a bistable flip-flop 6 which is so adjusted that a potential is constantly supplied to the AND-gate 4. The other input *b* of the other AND-gate 5 is directly connected to the oscillator 1*a* associated with the adjacent computer. The adjacent computer also comprises an emitter follower 2*a* and an amplifier 3*a*. The bistable flip-flop 6 is triggered by a detecting circuit 7 which detects the oscillator or clock pulses The detecting unit 7 consists of a circuit for determining the duration of the oscillator pulses which circuit is connected to a voltage level sensing circuit. The circuit determining the duration of the oscillator pulses consists of a first amplifier 71 with an associated integrating circuit 72 and a second amplifier 73 with an associated integrating circuit 74. The second amplifier 73 is connected to an inverting gate 75. The integrating circuit 72 will thus emit a signal having an amplitude which depends on the duration of the single oscillator pulse. The integrating circuit 74 will emit a signal having an amplitude which depends on the interval between two successive oscillator pulses. The two integrating circuits 72 and 74 respectively are connected to an input each of the level-sensing circuit 76 which for example consists of a Schmitt trigger or a differential amplifier. The output of the level-sensing circuit 7 is connected to the zero-setting input of the bistable flip-flop 6. The one-setting input of the bistable flip-flop 6 is in the same manner connected to a second detecting unit 7′ identical to the unit 7. The two inputs of the bistable flip-flop 6 thus cooperate with the circuits determining the duration of the oscillator pulses from the oscillators 1 and 1*a* respectively. In a corresponding way the flip-flop 6*a* is controlled by similar circuits 7*a* and 7*a*′.

The above-described arrangement works in the following manner. The crystal oscillator 1 generates an oscillator frequency which, firstly, is connected to the detecting unit 7 associated with the one computer unit A and, secondly, to the detecting unit 7*a* associated with the other computer unit B. These pulses of the oscillator pass directly to the first input *a* of the AND-gates 4 and 4*a* respectively, the other input *b* of the circuits being connected to the one-outputs of the bistable flip-flops 6 and 6*a* respectively. As the bistable flip-flops are set to one, which means that a signal is received at the other input *b* of the AND-gates 4 and 4*a* respectively, the signal of the oscillator constituting the clock frequency of the computer can pass through the AND-gates 4 and 4*b* respectively and through the OR-gates 8 and 8*a* respectively to the computer units A and B respectively.

If for some reason the pulses of the oscillator cease or their duration is changed, the level-sensing circuits of the detecting units 7 and 7*a* will influence the bistable flip-flops 6 and 6*a* whereby the flip-flops change their states and signals are received at the input *a* of the other AND-gates 5 and 5*a* respectively. Thus the clock frequency of the oscillator 1*a* will pass through the AND-gates 5 and 5*a* respectively and via the OR-gates 8 and 8*a* respectively to the computer units A and B respectively.

The amplifiers 3 and 3*a* respectively are designed so as to make it possible to influence the duration of the clock frequency pulses and the duration of the pulse intervals in order to test the circuits 71, 72 and 73, 74 respectively.

In FIG. 2 an embodiment of such an amplifier is shown. As appears from FIG. 2 the conductor 10 connected to the emitter follower amplifier 2 (FIG. 1) is connected to one input of an OR-gate 31, the other input of which is connected to a conductor 11. The output of the OR-gate 31 is connected to one of the inputs of an AND-gate 32, the other inverting input of which is connected to a conductor 12. The output of the AND-gate 32 is connected to an amplifying device 33, the output of which is connected to a conductor 13.

It is obvious from the figure that a potential at the conductor 11 can be used for extending the pulses while a potential on the conductor 12 can be used for extending the pulse intervals.

Furthermore it is necessary that the flip-flops 6 and 6*a* occupy the same state when the operation starts and for this purpose the input conductors of the flip-flops 6 and 6*a* have been provided with OR-gates 61, 60 and 61*a*, '60*a* respectively where the first input of the OR-gates 61 and 61*a* are connected to each other and to an input denoted oscillator 1. The first input of the OR-gates 60 and 60*a* are in a similar manner connected to each other and to an input denoted oscillator 1*a*, thus making it possible to choose one of the oscillators when starting the operation.

We claim:

1. An arrangement for generating synchronous clock pulses for at least two data processors operating in parallel, said apparatus comprising two identical circuits, each of said circuits having an output terminal for emitting clock pulses to a different one of the data processors, each of said circuits comprising first and second two-input AND gates having their outputs connected to said output terminal, a clock pulse oscillator, means for connecting the output of said clock pulse oscillator to a first input of said first two-input AND circuit, means for connecting the output of the clock pulse oscillator of the other of said identical circuits to a first input of said second two-input AND circuit, a bistable flip-flop having a one-output and a zero-output, a one-setting input, and a zero-setting input, means for connecting one of the outputs of said bistable flip-flop to the second input of said first two-input AND gate, means for connecting the other output of said bistable flip-flop to the second input of said second two-input AND gate, and a first detecting means for detecting faults in the clock pulses from the clock pulse oscillator of its associated identical circuit and connected to one of the setting inputs of said bistable flip-flop for transmitting trigger pulses thereto upon detecting of a fault, and a second detecting means for detecting faults in the clock pulses from the clock pulse oscillator of the other of said identical circuits and connected to the other of the setting inputs of said bistable flip-flop for transmitting a trigger pulse thereto upon detecting of a fault.

2. The arrangement of claim 1 wherein said detecting means includes means for sensing for changes in the duration of the clock pulses.

3. The arrangement of claim 1 wherein said detecting means comprise change-sensing means for sensing for changes in the duration of the clock pulses with respect to time between adjacent clock pulses.

4. The arrangement of claim 3 wherein said change-sensing means comprise an input terminal for receiving the clock pulses, a first integrating circuit, means for connecting said input terminal to said first integrating circuit, a second integrating circuit, signal-inverting means connecting said input terminal to said second integrating circuit, and a voltage level comparing circuit connected to said first and second integrating circuits.

5. The arrangement of claim 4 wherein said voltage level comparing circuit includes a Schmitt trigger.

6. The arrangement of claim 5 wherein said voltage level comparing circuit includes a differential amplifier.

7. The arrangement of claim 1 and further comprising means for monitoring said detecting means, said monitoring means comprising means for controllably varying the duration of the clock pulses.

* * * * *